(12) United States Patent
Ananthakrishnan (10) Patent No.: US 12,438,917 B1
(45) Date of Patent: Oct. 7, 2025

(54) NETWORK SECURITY GATEWAY (71) Applicant: Auradine, Inc., Santa Clara, CA (US)

(72) Inventor: Viswesh Ananthakrishnan, Palo Alto, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/508,861

(22) Filed: Nov. 14, 2023

Related U.S. Application Data (60) Provisional application No. 63/538,718, filed on Sep. 15, 2023.

(51) Int. Cl.
*H04L 9/40* (2022.01)
*H04L 41/16* (2022.01)

(52) U.S. Cl.
CPC .............. *H04L 63/20* (2013.01); *H04L 41/16* (2013.01); *H04L 63/102* (2013.01)

(58) Field of Classification Search
CPC ........ H04L 63/20; H04L 41/16; H04L 63/102
See application file for complete search history.

(56) References Cited

U.S. PATENT DOCUMENTS

| | | | |
|---|---|---|---|
| 11,876,858 B1 * | 1/2024 | Nair | H04L 67/1008 |
| 11,972,255 B2 * | 4/2024 | Bulut | G06F 8/10 |
| 2021/0273954 A1 | 9/2021 | Linton et al. | |
| 2022/0311805 A1 * | 9/2022 | Talati | H04L 63/20 |
| 2023/0135179 A1 | 5/2023 | Mielke et al. | |
| 2023/0208869 A1 | 6/2023 | Bisht et al. | |
| 2023/0245654 A1 | 8/2023 | Shrivastava et al. | |
| 2023/0315856 A1 | 10/2023 | Lee et al. | |
| 2024/0045990 A1 * | 2/2024 | Boyer | G06F 40/20 |
| 2024/0078337 A1 * | 3/2024 | Kamyshenko | G06F 21/6245 |
| 2024/0144192 A1 | 5/2024 | Weissenberger et al. | |
| 2024/0155024 A1 | 5/2024 | Palladino et al. | |
| 2025/0097237 A1 * | 3/2025 | Parla | H04L 63/1433 |

OTHER PUBLICATIONS

Xiao, Xusheng, et al. "Automated extraction of security policies from natural-language software documents." Proceedings of the ACM SIGSOFT 20th International Symposium on the Foundations of Software Engineering. 2012. (Year: 2012).*
U.S. Appl. No. 18/417,186, filed Jan. 19, 2024, Xu et al.
International Search Report and Written Opinion in International Appln. No. PCT/US2024/046634, mailed on Nov. 20, 2024, 10 pages.

* cited by examiner

*Primary Examiner* — Harris C Wang
(74) *Attorney, Agent, or Firm* — Fish & Richardson P.C.

(57) ABSTRACT

A security gateway accesses data in a communications session between a client device and an application hosted by a server. The security gateway inspects security parameters corresponding to the data using one or more large language models (LLMs). In response to inspecting the security parameters corresponding to the data, the security gateway performs one or more security operations on the data in accordance with one or more security policies associated with the one or more LLMs.

20 Claims, 5 Drawing Sheets

NETWORK SECURITY GATEWAY

CROSS-REFERENCE TO RELATED APPLICATIONS

This application claims benefit of the U.S. Provisional Application No. 63/538,718, filed Sep. 15, 2023, the contents of which are hereby incorporated in its entirety.

TECHNICAL FIELD

The following disclosure generally relates to techniques and apparatuses for a network security gateway.

BACKGROUND

Communications between end users, such as client devices, and remote applications, such as applications hosted by network servers, carry security risks. The security risks include access control, leakage of users' intellectual property or sensitive data, exposure to harmful content, among others. The risks can be greater when client devices communicate with applications that use natural language data, such as those used by Generative artificial intelligence (AI) applications.

SUMMARY

The present disclosure describes methods and apparatuses for a security gateway that is deployed between client devices and remote network servers that the client devices communicate with to use applications hosted by the servers. The security gateway is hosted in the network and acts as a proxy in the network connections between the client devices and the network servers. The security gateway can use one or more large language models (LLMs) to monitor natural language data between the client devices and the server applications, and perform one or more security operations on the data in accordance with one or more security policies associated with the one or more LLMs.

In some examples, the security gateway can inspect a multimedia document exchanged between a client device and a server, determine whether the multimedia document include content based on data generated using an application hosted by another server, and identify sources corresponding to the content. Thus, the security gateway can provide enhanced data traceability. With enhanced data traceability, the security gateway can ensure comprehensive data provenance, allowing for meticulous tracking of the data's origin within documents. The security gateway can offer users the ability to precisely determine the source of document content, and the security gateway can provide superior data tracking capabilities to enable detailed auditing of data sources in document creation. The security gateway can also afford unparalleled visibility into the origins and history of document data, providing high-fidelity data source mapping and ensuring that users can effortlessly trace the genesis of information within documents. Moreover, the security gateway's data tracing capabilities can permit a deep dive into the document's information sources for verification and validation purposes.

In some examples, the security gateway can access data exchanged between a client device and a server to determine an application hosted by the server, a user account corresponding to the application that is used by the client device to access the application, operations performed by the client, and data repositories that are accessed by the client device during the operations. Based on the determining, the security gateway can perform one or more security operations. Thus, the security gateway can provide classification of user activities with greater granularity. The classification confers several advantages for systems that aim to analyze and leverage user behavior data effectively. For example, with detailed classification, services can be tailored to the individual preferences and behaviors of users, improving user satisfaction and engagement. Granular data allows for a more nuanced understanding of how users interact with a system, which can inform design improvements and optimize the user interface for better usability. Greater detail in classification reveals the subtleties of user behavior, leading to more accurate insights and a deeper understanding of user actions and motivations. Fine-grained behavioral data can improve the accuracy of predictive models, leading to better forecasting of future user actions. By breaking down activities into granular components, it is easier to detect anomalous behavior that could indicate fraud, security breaches, or non-compliance with policies. Granular activity data enhances the capability of user behavior analytics (UBA) tools to learn normal user behavior patterns and detect potentially malicious deviations. By understanding the specific actions users perform, it is possible to implement more precise access controls that limit users to the minimum levels of access required for their activities (principle of least privilege). With better visibility into user activities, organizations can assess and manage risks more effectively, taking action to mitigate risks associated with user behavior.

In one aspect, a security gateway performs a method that includes: accessing data in a communications session between a client device and an application hosted by a server, wherein the client device and the server are communicably coupled to the security gateway through one or more network connections; inspecting security parameters corresponding to the data using one or more LLMs; and in response to inspecting security parameters corresponding to the data, performing one or more security operations on the data in accordance with one or more security policies associated with the one or more LLMs.

Particular implementations may include one or more of the following features.

In some implementations, accessing the data includes processing natural language data. In some implementations, the application is a Generative AI (GenAI) application, and the communications session corresponds to GenAI communications between a user of the client device and the application. In some implementations, the GenAI application is associated with one or more third party LLMs that are distinct from the one or more LLMs used by the security gateway.

In some implementations, the one or more LLMs are trained to implement the one or more security policies by inspecting natural language data.

In some implementations, the security gateway includes one or more processors which include one or more of field programmable gate array (FPGA), application specific integrated circuit (ASIC) processors, central processing units (CPUs), graphics processing units (GPUs), digital signal processors (DSPs), system on a chip (SoC), microcontrollers, or quantum processors. In some implementations, the security gateway includes one or more storage units that store instructions executed by the one or more processors, and data used by the security gateway. In such implementations, the storage units include one or more of hard disk drives (HDDs), solid-state drives (SSDs), random access memories (RAMs), read-only memories (ROMs), optical discs, USB flash drives, memory cards, network attached storage (NAS), storage area network (SAN), tape drives, or cloud storage. In some implementations, the security gateway is realized using one or more server devices that are connected to one another, to the client devices and to the application servers over network connections.

In another aspect, a security gateway performs a method that includes: inspecting a multimedia document exchanged during a communications session between a client device and a server, wherein the client device and the server are communicably coupled to the security gateway through one or more network connections, and wherein the multimedia document comprises natural language data; in response to the inspecting, determining that one or more pieces of data in the natural language data are based on data generated using at least one application hosted by another server in one or more other communications sessions, wherein the at least one application comprises a GenAI application; and in response to determining that the one or more pieces of data in the natural language data are based on the data generated using the at least one application, identifying one or more sources corresponding to the one or more pieces of data, wherein the one or more sources are different from the at least one application.

Particular implementations may include one or more of the following features.

In some implementations, inspecting the multimedia document exchanged during the communications session between the client device and the server includes inspecting the multimedia document using natural language processing (NLP).

In some implementations, the natural language data in the multimedia document includes one or more of textual data, visual data, audio data, or multimedia data.

In some implementations, the data generated using the at least one application is generated using content obtained from the one or more sources.

In some implementations, determining that the one or more pieces of data in the natural language data are based on the data generated using the at least one application includes: determining, using one or more LLMs, that the one or more pieces of data in the natural language data are based on the data generated using the at least one application, wherein the one or more LLMs are different from one or more other LLMs used by the at least one application.

In some implementations, determining that the one or more pieces of data in the natural language data are based on the data generated using the at least one application includes: performing similarity matching between the natural language data in the multimedia document and the data generated using the at least one application; and determining, based on the similarity matching, that the one or more pieces of data in the natural language data are based on the data generated using the at least one application. In such implementations, performing the similarity matching between the natural language data in the multimedia document and the data generated using the at least one application includes: converting the natural language data into first numerical vectors; converting the data generated using the at least one application into second numerical vectors; and comparing the first numerical vectors to the second numerical vectors to measure a similarity between the natural language data and the data generated using the at least one application. In such implementations, determining, based on the similarity matching, that the one or more pieces of data in the natural language data are based on the data generated using the at least one application includes: in response to determining that a similarity between the one or more pieces of data in the natural language data and the data generated using the at least one application exceeds a pre-determined threshold, determining that the one or more pieces of data in the natural language data are based on the data generated using the at least one application.

In yet another aspect, a security gateway performs a method that includes: accessing data exchanged during a communications session between a client device and a server, wherein the client device and the server are communicably coupled to the security gateway through one or more network connections; determining, based on the data exchanged during the communications session, an application hosted by the server and accessed by the client device in the communications session; determining a user account corresponding to the application that is used by the client device to access the application in the communications session; determining one or more operations performed by the client device with the application in the communications session; determining one or more data repositories that are accessed by the client device during the one or more operations; and in response to determining one or more of the user account, the one or more operations, or the one or more data repositories, performing one or more security operations.

Particular implementations may include one or more of the following features.

In some implementations, determining, based on the data exchanged during the communications session, the application hosted by the server and accessed by the client device in the communications session includes: analyzing one of more of the following: executable file names, application window titles, or application metadata.

In some implementations, the application uses one or more GenAI models. In such implementations, determining the one or more operations performed by the client device with the application in the communications session includes: analyzing one or more of the following: patterns in user interactions with the application, sequences of commands, or sequences of accessed application modules.

In some implementations, determining the one or more operations performed by the client device with the application in the communications session includes: determining, by the security gateway using one or more LLMs, the one or more operations performed with the application in the communications session, wherein the one or more LLMs are different from one or more other LLMs used by the application.

In some implementations, determining the one or more data repositories that are accessed during the one or more operations includes: analyzing one or more of the following: file paths, database queries, or network access logs related to the one or more operations.

In some implementations, the application includes a GenAI application.

Implementations further include a computer system including one or more processors and one or more memories. The computer system is configured to perform the above-described operations.

Implementations further include a non-transitory computer-readable storage medium. The non-transitory computer-readable storage medium store instructions for performing the above-described operations.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Generative AI (GenAI) is gaining popularity and adoption at a rapid rate, driving productivity, analytics, and entertainment, among others, across multiple verticals such as healthcare, technology, banking and retail. However, this technology brings many security risks-both for the end user as well as for the enterprises building applications using GenAI. These security risks include: difficulty in implementing access control, e.g., extending role based access control (RBAC) to training, response data; leakage of users' intellectual property and/or sensitive data, e.g., including personally identifiable information; generation of toxic/harmful/hateful content; indirect prompt injection attacks; not compliant with specific regulatory standards; lack of visibility into audit logs, for interactions with GenAI products; hallucinations (inaccuracies) in GenAI response; denial of service attacks (by single user or entity); and new attacks from fraudulent LLM applications.

It would be useful to have solutions for end users (e.g., enterprises that enable its users or employees to use GenAI applications and technologies) that guard against these risks in a way that is easy to adopt/implement, performant, highly available, scalable and effective.

Figure 1:
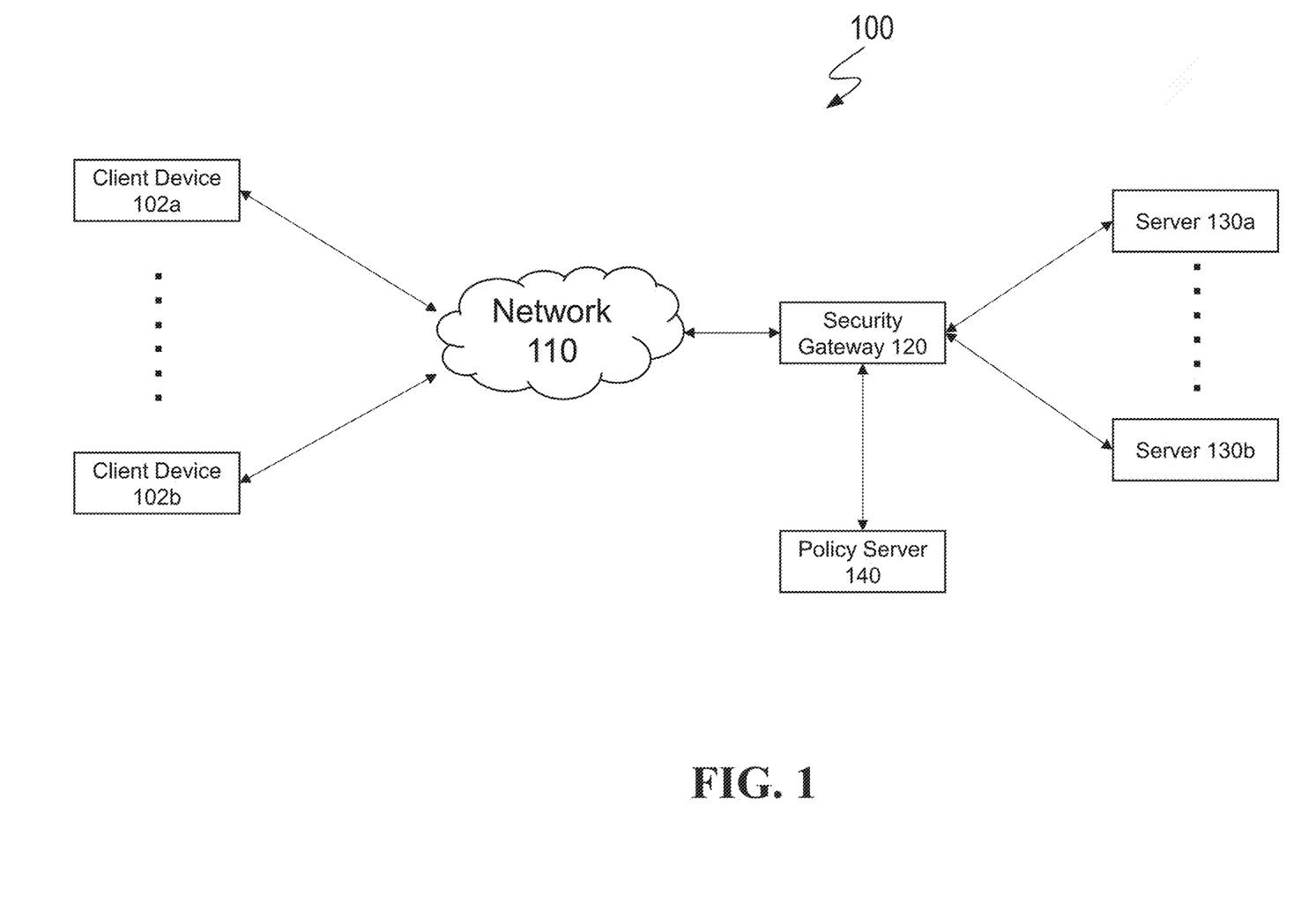
FIG. 1 illustrates a schematic diagram of an example system for provisioning network security, according to some implementations.

FIG. 1 illustrates a schematic diagram of an example system 100 for provisioning network security in GenAI based technologies. As shown, system 100 includes one or more client devices 102a and 102b that are connected to one or more remote servers 130a-130b, through a communications network 110. Security gateway 120 is deployed in the network and acts as a proxy for the connections between the client devices 102a-102b and the servers 130a-130b.

In some implementations, network 110 includes one or more wired or wireless connections. In some examples, the wired connections can utilize copper cabling, fiber optics, or other conductive materials to form a physical link between network endpoints. In some examples, the wireless connections can employ radio frequency (RF) signals, infrared (IR) communication, or other non-tethered means for data transmission. In some examples, network 110 is equipped with one or more routers, switches, and security gateways that manage the data traffic flow, enforce security policies, and maintain network integrity. In some examples, network 110 is configured with mechanisms for error detection and correction, quality of service (QOS) management, and traffic prioritization to optimize the efficiency and reliability of data transmission across the network. In some implementations, network 110 includes the Internet.

In some implementations, one or more of client device 102a-102b are designed to interface with a network (e.g., network 110) to access, process, and exchange data. One or more of client device 102a-102b can be configured to operate within a network environment that comprises a multiplicity of other computing entities and resources.

In some examples, one or more of client devices 102a-102b can include one or more processing units capable of executing instructions, one or more memory components for storing data and instructions, and communication hardware to facilitate wired or wireless connectivity to the network. In some examples, one or more of client devices 102a-102b can be a portable handheld device, a wearable device, a desktop computer, or any other electronic device capable of sending and receiving data. One or more of client devices 102a-102b can be equipped with one or more input mechanisms, such as a touchscreen interface, keyboard, mouse, stylus, or voice recognition sensors, to allow a user to interact with applications and services provided through the network. One or more of client devices 102a-102b can be equipped with one or more output mechanisms, such as a display screen, audio speakers, or haptic feedback devices to convey information to the user. In some examples, one or more of client devices 102a-102b can incorporate a suite of sensors to enhance user interaction and provide contextual data to applications. In such examples, these sensors can include, but are not limited to, GPS receivers, accelerometers, gyroscopes, and environmental sensors.

In some examples, one or more of client devices 102a-102b can be further equipped with power management components to optimize energy consumption, including a battery and power control logic. One or more of client devices 102a-102b can be configured to support various forms of network protocols and standards to ensure compatibility and interoperability with the broader network ecosystem. Software components installed on client devices 102a-102b can enable a range of functions from basic data processing and communication to advanced computational tasks, facilitated by the operating system and application software. One or more of client devices 102a-102b can have a modular design that allows for extensibility and upgrades through additional hardware or software modules, ensuring adaptability to evolving technologies and user requirements.

In some implementations, one or more of client devices 102a-102b are used by or associated with entities (e.g., employees) of an enterprise, such as an organization or a corporation. For example, the client devices 102a-102b can be computers used by employees of an enterprise. In some implementations, one or more of client devices 102a-102b are used by individual users. For example, in such implementations, one or more of client devices 102a-102b can be personal computers of individual users.

In some implementations, one or more of servers 130a-130b are configured to manage, store, and disseminate data across a network (e.g., network 110). In some implementations, one or more of servers 130a-130b network server are comprised of high-performance hardware components including, but not limited to, one or more central processing units (CPUs) for executing programmatic instructions, volatile memory (RAM) for temporary data storage and rapid access, and non-volatile memory (such as HDDs or SSDs) for persistent data storage. In such implementations, these components are interconnected via a high-speed bus system and are housed within a chassis that is scalable to accommodate additional hardware resources as needed.

In some implementations, one or more of servers 130a-130b are configured to include network interface components that facilitate connectivity with various network topologies, supporting both wired and wireless communication standards to service a multitude of client devices concurrently. In some implementations, one or more of servers 130a-130b operate under a server operating system that manages system resources and provides a stable platform for server applications, including but not limited to, web services, database management systems, file services, and application servers.

In some implementations, one or more of servers 130a-130b are configured with software-defined networking capabilities to allow for dynamic network configuration, optimizing data flow and resource allocation based on real-time network demands. In such implementations, the software-defined networking capabilities provide security mechanisms, featuring advanced encryption standards, secure access protocols, and an intrusion detection and prevention system (IDPS) to safeguard against unauthorized access and potential threats.

In some implementations, one or more of servers 130a-130b are capable of virtualization, creating multiple virtual machines (VMs) on a single physical hardware platform, each running distinct operating systems and applications. In such implementations, virtualization can be facilitated by a hypervisor, which abstracts processor, memory, storage, and other resources into multiple execution environments, which enhances the server's efficiency and flexibility in providing services.

In some implementations, one or more of servers 130a-130b are configured for scalability and high availability, with redundant power supplies, network connections, and storage systems to maintain operational continuity. Advanced management tools can be provided for configuring, monitoring, and maintaining the server's performance and health, which can be accessed locally or remotely, ensuring effective and efficient administration of network resources.

In some implementations, one or more of servers 130a-130b host applications that are used by the enterprise users. In some implementations, one or more of servers 130a-130b are associated with (e.g., owned, administrated) third parties external to the enterprise. In some implementations, these applications include AI applications. The AI applications can be GenAI applications, for example third party applications using a GenAI model such as ChatGPT, Google Bard, Replika, Jasper, Copy.ai, GitHub Copilot, DeepL Translator, DALL-E, Soundraw.io, AIVA, Runway ML, Chatbot services by IBM Watson, and Zo Convert, etc. In some implementations, these applications include do-it-yourself (DIY) or custom enterprise AI applications, for example, based on a GenAI model such as Support CoPilot. In some implementations, the DIY enterprise applications are custom applications that are built internally at the enterprise.

In some implementations, the server applications hosted by servers 130a-130b include email, voice, video or other textual data applications that incorporate GenAI tools or features, and the communications monitored by security gateway 120 include natural language data that are exchanged between client devices 102a-102b and these various multimedia applications.

In some implementations, security gateway 120 is operable to safeguard communication networks from a spectrum of cyber threats and unauthorized access. In such implementations, security gateway 120 analyzes incoming and outgoing data traffic to ensure compliance with established security policies.

In some implementations, security gateway 120 includes one or more high-performance central processing units (CPUs) to manage the computational demands essential for inspecting and filtering substantial network traffic volumes. In some implementations, security gateway 120 include one or more memories, such as RAMs, to facilitate the processing of active network connections and their associated security rulesets, as well as enabling rapid data retrieval. In some implementations, security gateway 120 includes multiple high-speed network interface cards (NICs) to interface with the network, supporting a range of bandwidth connections that may extend to 1 Gbps, 10 Gbps, or beyond. In some implementations, security gateway 120 includes a storage subsystem that utilizes flash memory or solid-state drives (SSDs) for the durable retention of the operating system, logs, configurations, and essential operational data.

In some implementations, security gateway 120 includes specialized security acceleration hardware to optimize cryptographic functions and bolster the performance of critical security operations, including encryption and decryption processes. In some implementations, security gateway 120 includes redundant power supplies to guarantee continuous functionality. In some implementations, security gateway 120 includes physical interfaces, such as USB ports for straightforward management, console ports for direct configuration, and, in some instances, HDMI ports for local display outputs.

In some implementations, security gateway 120 incorporates a multi-layered defense strategy consisting of a stateful firewall, an intrusion detection and prevention system (IDPS), and a deep packet inspection (DPI) engine. In such implementations, the firewall component operates by examining and filtering network traffic based on predetermined security rules, blocking or permitting data packets as they attempt to traverse the network boundary. The IDPS module monitors network activities for signs of malicious behavior, dynamically responding to potential threats by alerting system administrators and automatically taking preventative measures to thwart the attack. The DPI engine further enhances security measures by examining the data part of the traffic, beyond just the headers, allowing for a more granular analysis and real-time threat detection.

In some implementations, security gateway 120 is configured with an adaptive and modular architecture that allows for seamless integration of additional security functions such as antivirus filtering, anti-spam protection, VPN management, and advanced content filtering. These security functions work in concert to detect and mitigate a variety of threats ranging from malware and phishing to network intrusions and data exfiltration attempts.

In some implementations, security gateway 120 is configured with an encryption framework that secures data transmission channels, preserving the confidentiality and integrity of sensitive information. User authentication mechanisms are embedded within the system, enforcing stringent access controls and user verification processes to ensure that only authorized personnel can access network resources.

In some implementations, security gateway 120 includes a management console that provides a centralized platform for configuring security parameters, monitoring network status, and analyzing logs and alerts generated by the security gateway. In such implementations, this console supports both local and remote management capabilities, enabling administrators to maintain optimal network security posture from any location.

In some implementations, security gateway 120 is configured with advanced algorithms and machine learning techniques, allowing security gateway 120 to possess the capability to learn from traffic patterns, adapting its security mechanisms in real-time to evolving threats. This proactive stance ensures that the network defense remains resilient and effective against sophisticated and emerging cyber threats.

In some implementations, security gateway 120 is deployed between client devices (e.g., client devices 102a-102b) and remote network servers (e.g., servers 130a-130b) that the client devices communicate with to use applications hosted by the servers. In such implementations, security gateway 120 is hosted in the network and acts as a proxy in the network connections between the client devices and the network servers.

In some implementations, security gateway 120 is provided with security credentials by the enterprise, enabling security gateway 120 to inspect the data in the communications sessions between client devices 102a-102b and the server applications. In some examples, the data inspected by security gateway 120 can include natural language data. In some examples, security gateway 120 can process the data and perform security operations using one or more security LLMs.

Security gateway 120 can be configured for easy insertion in a network connection between end user client devices and remote server applications, and configured for capability evolution in dynamic environment. In some implementations, security gateway 120 is deployed as a man-in-the-middle between end users client devices, e.g., members of a distributed enterprise, and remote server applications that the users are communicating with. In such implementations, security gateway 120 decrypts HTTPS sessions and understands the natural language contents of the HTTP payload, after which it performs one or more security operations. These security operations include, for example, on GenAI traffic from end user to server application: role based access control; filter input query (e.g., user prompt) for intellectual property, and sensitive data leakage, toxic language, personally identifiable information, and malicious queries; prompt generation and acceleration to reduce hallucinations and improve explainability; mask (anonymize) sensitive data; guard against indirect prompt injections; audit; and visibility into user queries and/or application responses.

As another example, the security operations can include, on GenAI traffic from the server application to the end user: unmask sensitive data; and moderate GenAI model response.

In some implementations, security gateway 120 uses FPGAs, ASICs and other hardware for running one or more large language models (LLMs), to monitor natural language data between client devices 102a-102b and servers 130a-130b.

In some implementations, security gateway 120 inspects the natural language application traffic and provides security enforcement, which includes role-based access control, prompt generation and acceleration, data anonymization, guarding against indirect prompt injections, or moderating GenAI model responses, among other enforcement operations.

In some implementations, security gateway 120 implements one or more security LLMs as cloud proxy. In such implementations, a security LLM is trained to implement security policies for natural language interactions, which includes processing natural language data and performing network security operations on the data based on the processing. Security gateway 120 can provide a runtime security solution that can process data for multiple different third-party LLMs and LLM-based applications, including from vendor-specific LLMs, open-source LLMs, custom or tuned enterprise LLMs. Security gateway 120 can also process third-party applications and/or DIY enterprise applications, among others.

In some implementations, a security LLM used by security gateway 120 is an AI model with a large number of parameters, which can range from a few million to hundreds of billions. In such implementations, these parameters use a large number (e.g., hundreds) of leading-edge processing units and large amounts of time (e.g., weeks) to train, and a large number of processing units for inference. In some implementations, the processing units that are used by security gateway 120 are realized using customized, task-specific silicon hardware and corresponding software. The hardware includes custom processors that are implemented in FPGAs or ASICs, among other suitable processing units. In some implementations, these hardware can be used to replace expensive graphical processing units (GPUs) from third party vendors. In such implementations, the security LLM is supported by engineered hardware acceleration solutions (e.g., FPGAs or ASICs) that provide a highly performant and economical solution to the challenge of inspecting Gen AI-bound application traffic and providing security enforcement. Accordingly, the security gateway can be configured for leading performance and highest scalability, while consuming a limited amount of power.

In some implementations, security gateway 120 implements one or more types of LLMs based on different architectures regarding encoder-decoder options for transformers (e.g., encoder-only, decoder-only, or encoder-decoder), to cover a wide spectrum of tasks, ranging from classification and understanding to the generation of new content. In such implementations, the LLMs implemented by security gateway 120 include one or more of the following types: Bidirectional Encoder Representations from Transformers (BERT), Robustly Optimized BERT Pretraining Approach (ROBERTa), Generative Pre-trained Transformer (GPT) series, Text-to-Text Transfer Transformer (T5), Bidirectional and Auto-Regressive Transformers (BART), Enhanced Representation through kNowledge Integration (ERNIE), XLNet, Language Model for Dialogue Applications (LaMDA), Large Language Model Architecture (LLaMA), LLAMA2, etc.

System 100 further includes policy server 140. In some implementations, policy server 140 is configured as a centralized repository and management console for security policies that dictate the security posture of an entire network infrastructure, to establish, manage, and distribute the security policies within the network environment. In some implementations, policy server 140 operates in conjunction with security gateway 120 to ensure the secure passage of data within a network and/or between an internal network and external networks.

In some implementations, policy server 140 includes one or more processing units and one or more memories. In such implementations, the one or more memories store instructions that, when executed by the processing units, facilitate the creation and modification of security policies. These policies are then communicated to security gateway 120, where they are enforced. Policy server 140 can be equipped with a user interface that allows system administrators to intuitively interact with the policy server to define, update, and retire security policies as threats evolve or business requirements change.

In some implementations, policy server 140 further includes a communication module to facilitate secure communication with the security gateway 120. The communication module can ensure that policy updates are delivered in a secure and reliable manner, employing encryption and integrity checks to prevent unauthorized access or tampering during transit.

In some implementations, policy server 140 is operable to receive feedback from security gateway 120 regarding the enforcement of the security policies and the observed network traffic. Such feedback can include logs, alerts, and metrics, which policy server 120 can use to automatically refine or suggest modifications to the existing policies, thus enabling dynamic security management.

In some implementations, policy server 140 is integrated with external data sources, such as threat intelligence feeds, to automatically update security policies in response to emerging threats. This proactive capability ensures that security gateway 120 is equipped with the most current and effective set of rules to defend against the latest security vulnerabilities and attack vectors.

In some implementations, policy server 140 is operable to streamline the administration of network security by serving as the authoritative system for policy lifecycle management, from policy creation through deployment and monitoring to policy decommissioning. This centralized control plane simplifies the complexity associated with managing distributed security infrastructure and provides a single point of reference for audit and compliance processes.

In some implementations, an example operating process of system 100 includes accessing, by a security gateway (e.g., security gateway 120), data in a communications session between a client device (e.g., client device 102a or 102b) and an application hosted by a server (e.g., server 130a or 130b). Then, the security gateway inspects security parameters corresponding to the data using one or more LLMs. In response to inspecting security parameters corresponding to the data, the security gateway performs one or more security operations on the data in accordance with one or more security policies associated with the one or more LLMs. The operating process will be described in greater detail below with reference to FIG. 2.

In some implementations, system 100 is operable to provide enhanced data tracing ability. In such implementations, a security gateway (e.g., security gateway 120) inspects a multimedia document exchanged during a communications session between a client device (e.g., client device 102a or 102b) and a server (e.g., server 130a), where the multimedia document includes natural language data. Then, the security gateway determines that one or more pieces of data in the natural language data are based on data generated using at least one application hosted by another server (e.g., server 130b) in one or more other communications sessions. Based on the determined one or more pieces of data, the security gateway identifies one or more sources corresponding to the one or more pieces of data. The operating process related to the enhanced data tracing ability will be described in greater detail below with reference to FIG. 3.

With enhanced traceability, the system can ensure comprehensive data provenance, allowing for meticulous tracking of the data's origin within documents. The system can offer users the ability to precisely determine the source of document content, and the system can provide superior data tracking capabilities to enable detailed auditing of data sources in document creation. The system can also afford unparalleled visibility into the origins and history of document data, providing high-fidelity data source mapping and ensuring that users can effortlessly trace the genesis of information within documents. Moreover, the system's data tracing capabilities can permit a deep dive into the document's information sources for verification and validation purposes.

In some implementations, system 100 is operable to provide classification of user activities with great granularities. In such implementations, a security gateway (e.g., security gateway 120) assesses data exchanged during a communications session between a client device (e.g., client device 102a or 102b) and a server (e.g., server 130a or 130b). The security gateway determines, based on the data exchanged during the communications session, an application hosted by the server and accessed by the client device in the communications session. The security gateway determines a user account corresponding to the application that is used by the client device to access the application in the communications session. The security gateway determines one or more operations performed by the client device with the application in the communications session. The security gateway determines one or more data repositories that are accessed by the client device during the one or more operations. In response to determining one or more of the user account, the one or more operations, or the one or more data repositories, the security gateway performs one or more security operations. The operating process related to the classification of user activities will be described in greater detail below with reference to FIG. 4.

Figure 4:
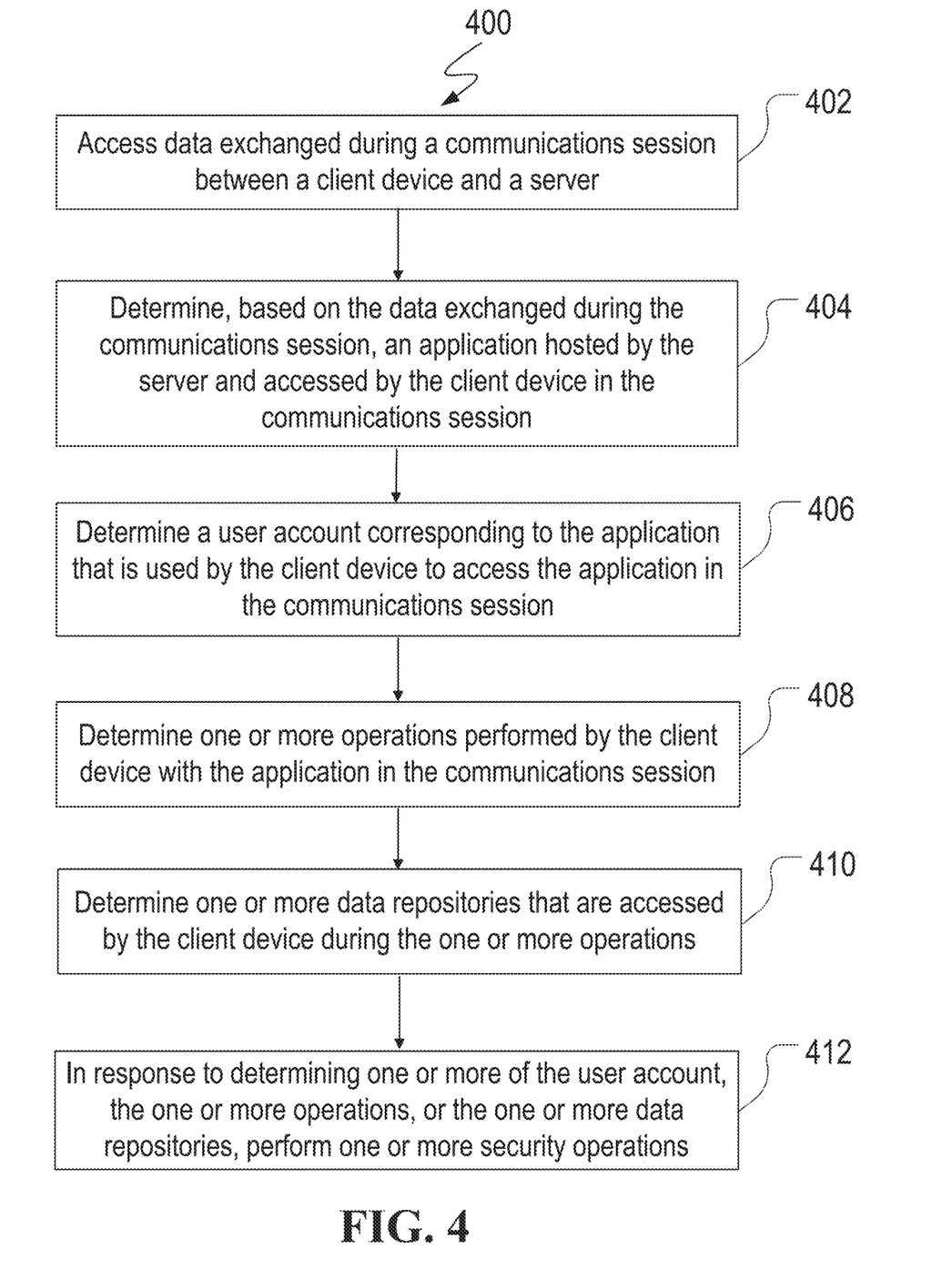
FIG. 4 illustrates a flowchart of an example process for classification of user activities, according to some implementations.

Providing classification of user activities with greater granularity confers several advantages for systems that aim to analyze and leverage user behavior data effectively. For example, with detailed classification, services can be tailored to the individual preferences and behaviors of users, improving user satisfaction and engagement. Granular data allows for a more nuanced understanding of how users interact with a system, which can inform design improvements and optimize the user interface for better usability. Greater detail in classification reveals the subtleties of user behavior, leading to more accurate insights and a deeper understanding of user actions and motivations. Fine-grained behavioral data can improve the accuracy of predictive models, leading to better forecasting of future user actions. By breaking down activities into granular components, it is easier to detect anomalous behavior that could indicate fraud, security breaches, or non-compliance with policies. Granular activity data enhances the capability of user behavior analytics (UBA) tools to learn normal user behavior patterns and detect potentially malicious deviations. By understanding the specific actions users perform, it is possible to implement more precise access controls that limit users to the minimum levels of access required for their activities (principle of least privilege). With better visibility into user activities, organizations can assess and manage risks more effectively, taking action to mitigate risks associated with user behavior.

Figure 2:
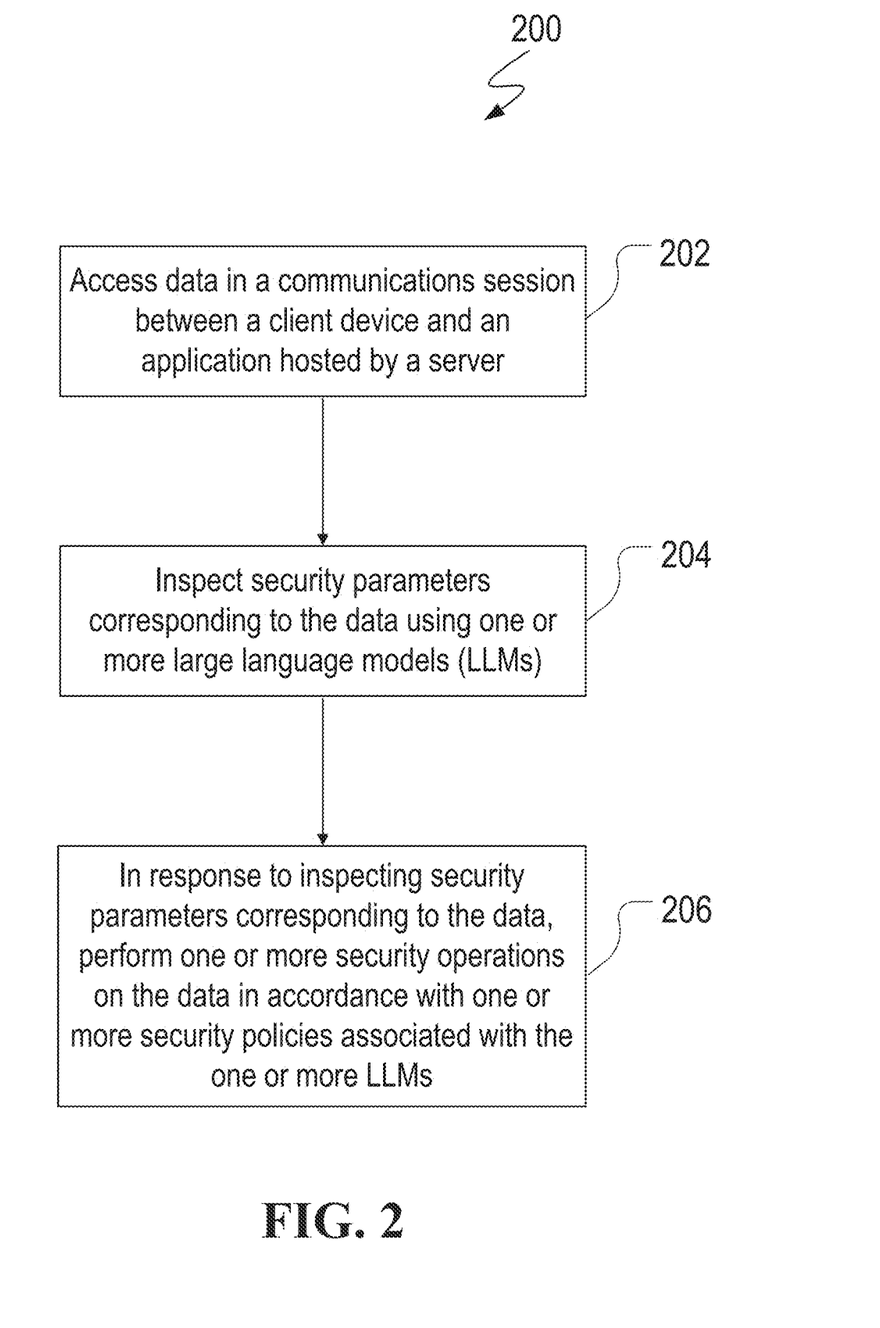
FIG. 2 illustrates a flow chart of an example process for performing security operations on data by a security gateway, according to some implementations.

FIG. 2 illustrates a flow chart of an example process 200 for performing security operations on data by a security gateway. In some implementations, process 200 is performed by security gateway 120 described in this disclosure. Accordingly, the following description of process 200 is provided with respect to security gateway 120. The operations shown in process 200 may not be exhaustive and that other operations can be performed as well before, after, or in between any of the illustrated operations. Further, some of the operations may be performed simultaneously, or in a different order than shown in FIG. 2.

In the process 200, security gateway 120 accesses data in a communications session between a client device and an application hosted by a server (202). For example, security gateway 120 can act as a proxy in the network and accesses data exchanged in communications sessions between one or more client devices 102a-102b and one or more applications hosted by the servers 130a-130b.

In some implementations, the data exchanged during the communications session between the client device and the application hosted by the server includes natural language data, and accessing the data includes processing the natural language data. In some implementations, the natural language data include any information that is produced using the languages that humans use for daily communication. In some examples, the natural language data can include one or more of the following: text data, spoken language data, multimedia language data, user-generated content, language annotations, machine-generated natural language, linguistic metadata, non-verbal data, etc.

In some implementations, the applications hosted by the server include email, voice, video or other textual data applications, and the communications monitored by security gateway 120 include natural language data that are exchanged between client devices 102a-102b and these various multimedia applications.

In some implementations, the applications hosted by the server include a GenAI application, and the communications session corresponds to GenAI communications between a user of the client device and the GenAI application. In such implementations, the GenAI application is associated with one or more third party LLMs that are distinct from the one or more LLMs used by security gateway 120.

In some implementations, the LLMs used by security gateway 120 are off-the-shelf LLMs that are pre-trained, generalized AI models available for immediate use.

In some implementations, the LLMs used by security gateway 120 are customized LLMs which have been tailored to fit the unique linguistic and task-specific requirements of particular applications or industries. In such implementations, these customizations can range from training the models on domain-specific corpora to fine-tuning them on a particular style or jargon. In some implementations, the LLMs used by security gateway 120 can be customized security LLMs that are trained on a corpus that includes security-related documentation, threat intelligence reports, vulnerability databases, and system log. In some examples, the LLMs used by security gateway 120 can be trained on datasets encompassing threat analysis reports, security bulletins, white papers, and datasets of known vulnerabilities. The LLMs used by security gateway 120 can be trained to possess the capability to interpret and synthesize security protocols, identify potential security breaches, suggest countermeasures, and understand the intricacies of network architectures and potential attack vectors. The LLMs used by security gateway 120 can be trained to aid in automating the detection of threats by parsing and analyzing vast amounts of data, including network logs and real-time system alerts. The LLMs used by security gateway 120 can be trained to generate human-like explanations of complex security concepts, craft security policy documents, and provide recommendations for system hardening and compliance.

In some implementations, the one or more LLMs used by security gateway 120 are trained to implement one or more security policies by inspecting natural language data. In some examples, the security policies implemented by the LLMs can include one or more of the following: traffic filtering policy, intrusion prevention policy, VPN enforcement policy, antivirus/antimalware policy, data loss prevention (DLP) policy, bandwidth management policy, authentication and authorization policy, secure socket layer (SSL) inspection policy, logging and monitoring policy, incident response policy, configuration and patch management policy, etc. Note that the examples provided above are illustrative and by no means exhaustive. In some implementations, the security policies are dynamic and flexible, allowing for the incorporation of any suitable parameters that address specific risks, regulatory requirements, and evolving security challenges.

Process 200 continues with inspecting security parameters corresponding to the data using one or more LLMs (204). For example, security gateway 120 can use one or more security LLMs described above to analyze and process the data exchanged in the communications session. In some implementations, inspecting the data comprises analyzing and processing natural language data used in GenAI applications, as described above.

In some examples, the security parameters corresponding to the data can include intellectual property, sensitive data, user credentials, personally identifiable information, etc. In some examples, the security parameters can include access control lists that define which users or system processes are granted access to objects, as well as what operations are allowed on given objects. In some examples, the security parameters can include encryption keys that determine the encryption of data at rest and in transit, including key types (e.g., symmetric, asymmetric), key lengths, and key management policies. In some examples, the security parameters can include firewall rules that allow or deny network traffic based on IP address, port number, and protocol to protect against unauthorized access. In some examples, the security parameters can include password policies that specify the complexity requirements for passwords, including minimum length, character types, expiration time, and history. In some examples, the security parameters can include physical security controls parameters related to securing physical access to systems and data, such as biometric scanners, door access codes, and surveillance systems.

Note that the examples provided above are illustrative and by no means exhaustive. Security parameters encompass a broad range of measures and settings and are not limited to the ones listed. In some implementations, the security parameters include any suitable parameters that enhance the security posture of an environment, deter potential threats, and align with specific security requirements.

In response to inspecting security parameters corresponding to the data, process 200 can perform one or more security operations on the data in accordance with one or more security policies associated with the one or more LLMs (206). For example, security gateway 120 performs one or more security operations as described above, based on processing the communications session data using one or more security LLMs.

In some examples, the security operations can include, on GenAI traffic from end user to server application: role based access control; filter input query (e.g., user prompt) for intellectual property, and sensitive data leakage, toxic language, personally identifiable information, and malicious queries; prompt generation and acceleration to reduce hallucinations and improve explainability; mask (anonymize)

sensitive data; guard against indirect prompt injections; audit; and visibility into user queries and/or application responses.

In some examples, the security operations can include, on GenAI traffic from the server application to the end user: unmask sensitive data; and moderate GenAI model response.

Figure 3:
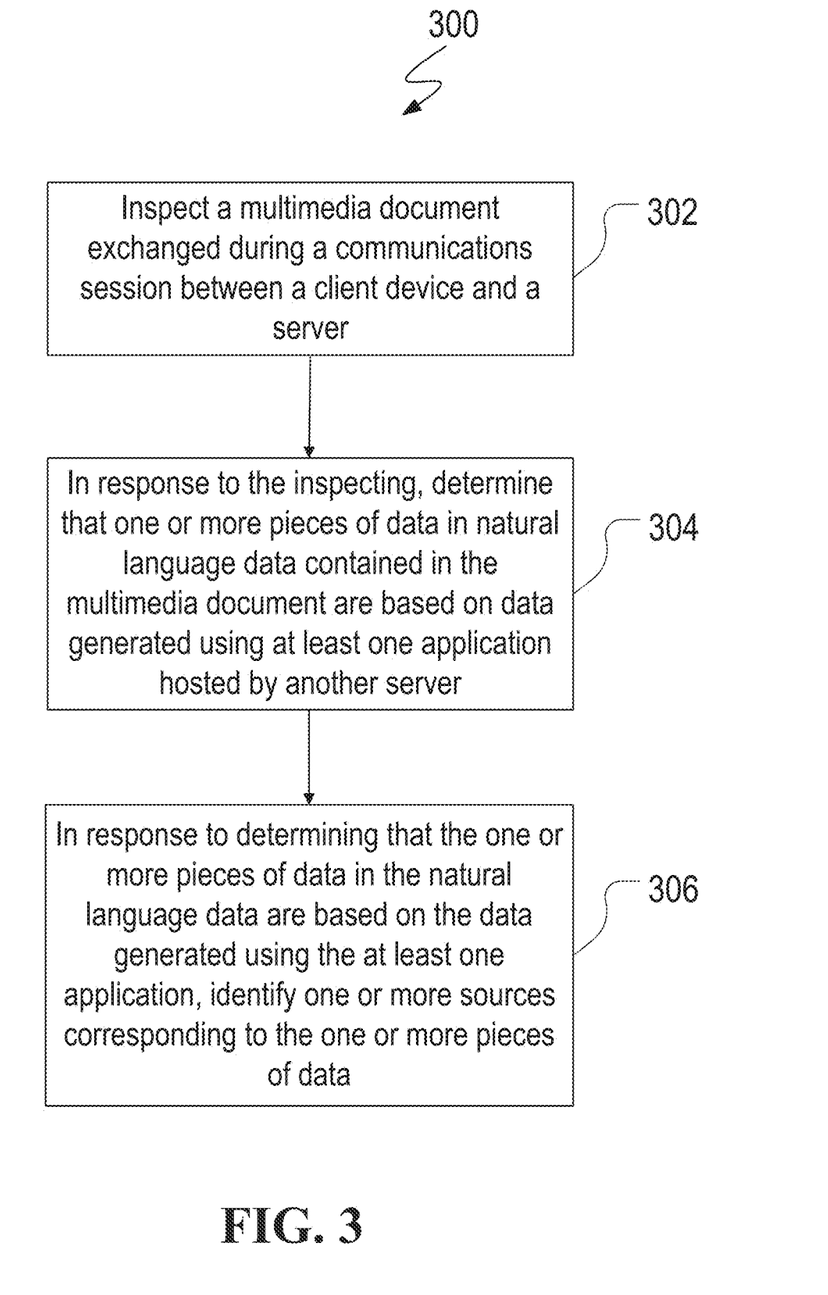
FIG. 3 illustrates a flowchart of an example process for data tracing, according to some implementations.

FIG. 3 illustrates a flowchart of an example process 300 for data tracing, in accordance with some implementations of the present disclosure. In some implementations, process 300 is performed by security gateway 120 described in this disclosure. Accordingly, the following description of process 300 is provided with respect to security gateway 120. The operations shown in process 300 may not be exhaustive and that other operations can be performed as well before, after, or in between any of the illustrated operations. Further, some of the operations may be performed simultaneously, or in a different order than shown in FIG. 3.

In the process 300, security gateway 120 inspects a multimedia document exchanged during a communications session between a client device and a server (302). For example, security gateway 120 can inspect a multimedia document exchanged during a communications session between client device 102a and server 130a.

In some implementations, the multimedia document includes text, images, audio, video, and other media to create rich and interactive content. In some examples, the multimedia document can include one or more of the following: interactive e-books and e-magazines, multimedia presentations, educational materials and courseware, technical manuals and eLearning modules, digital portfolios, multimedia websites, rich media advertisements, animated infographics, virtual reality (VR) content, augmented reality (AR) manuals, video games, video podcasts, mobile applications, software demos, webinars and virtual events, music videos, online galleries, digital signage, etc.

In some implementations, the multimedia document includes natural language data. In such implementations, the natural language data includes any information that is produced using the languages that humans use for daily communication. In some examples, the natural language data can include one or more of the following: text data, spoken language data, multimedia language data, user-generated content, language annotations, machine-generated natural language, linguistic metadata, non-verbal data, etc.

In some implementations, the multimedia document is inspected by security gateway 120 using natural language processing (NLP) to determine the natural language data. In some examples, the natural language processing on the multimedia document can begin with a comprehensive extraction process where textual data is harvested from the multimedia document, e.g., using advanced speech recognition algorithms to transcribe audio components and optical character recognition (OCR) technology to convert visual text elements into an analyzable digital format. Additionally, video processing techniques can be utilized to capture subtitles and any on-screen text. Once textual data is aggregated, it is subjected to a robust NLP workflow. This process can involve tokenization to dissect the text into foundational units, normalization to standardize textual data, and sophisticated algorithms for stemming and lemmatization to reduce words to their grammatical roots. Entity recognition modules can be deployed to identify and categorize key information, while sentiment analysis algorithms assess the tone and subjective information.

In response to inspecting the multimedia document, security gateway 120 determines that one or more pieces of data in the natural language data in the multimedia document are based on data generated using at least one application hosted by another server in one or more other communications sessions (304). For example, security gateway 120 can determine that one or more pieces of data in the natural language data of the multimedia document, which is exchanged in a first communication session between client device 102a and server 130a, are based on data generated using an application hosted by server 130b in a second communications session.

In some implementations, the at least one application hosted by another server includes a GenAI application, such as third-party applications using a GenAI model. For example, the at least one application can include an LLM-based GenAI application. In some implementations, the at least one application hosted by another server includes email, voice, video, or other textual data applications.

In some implementations, the data generated by using the at least one application can include rich textual content, ranging from imaginative literary compositions to meticulously crafted news articles, product descriptions, and even complex software code. The data generated by using the at least one application can include artwork that emulates specific artistic styles, realistic synthetic images of human faces, and intricate layouts for various media. The data generated by using the at least one application can include complete musical pieces, natural-sounding human voices for diverse applications, and unique sound effects. The data generated by using the at least one application can include short form video content, including deepfake videos and animations, with high realism and fidelity. The data generated by using the at least one application can include detailed 3D models useful in architecture, gaming, and product design. The data generated by using the at least one application can include simulated datasets, e.g., for training other machine learning models where privacy or data scarcity issues arise. The data generated by using the at least one application can include synthetic imaging data and patient records for educational and system testing purposes.

In some implementations, security gateway 120 is operable to determine, using one or more LLMs, that the one or more pieces of data in the natural language data are based on the data generated using the at least one application. In such implementations, the one or more LLMs used by security gateway 120 are different from one or more other LLMs used by the at least one application.

In some implementations, the LLMs used by security gateway 120 are off-the-shelf LLMs that are pre-trained, generalized AI models available for immediate use.

In some implementations, the LLMs used by security gateway 120 are customized LLMs which have been tailored to fit the unique linguistic and task-specific requirements of particular applications or industries. In such implementations, these customizations can range from training the models on domain-specific corpora to fine-tuning them on a particular style or jargon. In some implementations, the LLMs used by security gateway 120 can be customized security LLMs that are trained on a corpus that includes security-related documentation, threat intelligence reports, vulnerability databases, and system log. In some examples, the LLMs used by security gateway 120 can be trained on datasets encompassing threat analysis reports, security bulletins, white papers, and datasets of known vulnerabilities. The LLMs used by security gateway 120 can be trained to possess the capability to interpret and synthesize security protocols, identify potential security breaches, suggest countermeasures, and understand the intricacies of network architectures and potential attack vectors. The LLMs used by security gateway 120 can be trained to aid in automating the detection of threats by parsing and analyzing vast amounts of data, including network logs and real-time system alerts. The LLMs used by security gateway 120 can be trained to generate human-like explanations of complex security concepts, craft security policy documents, and provide recommendations for system hardening and compliance.

In some examples, security gateway 120 can encode the textual content of the natural language data of the multimedia document and the data generated using the at least one application into high-dimensional vector spaces using the one or more LLMs' advanced semantic understanding capabilities. These vectors allow for the computation of similarity metrics, such as cosine similarity or Euclidean distance. By leveraging the nuanced comprehension of context and language intricacies that the LLMs possess, security gateway 120 can accurately assess and quantify the degree of similarity between any given pair of documents.

In some implementations, security gateway 120 is operable to perform similarity matching between the natural language data in the multimedia document and the data generated using the at least one application, and determine, based on the similarity matching, that the one or more pieces of data in the natural language data are based on the data generated using the at least one application.

In some examples, security gateway 120 can convert the natural language data into first numerical vectors, convert the data generated using the at least one application into second numerical vectors, and compare the first numerical vectors to the second numerical vectors to measure a similarity between the natural language data and the data generated using the at least one application. In such examples, if a measured similarity between one or more pieces data of the natural language data and a portion of the data generated using the at least one application exceeds a pre-determined threshold, security gateway 120 can determine that the one or more pieces of data in the natural language data are based on the data generated using the at least one application.

In response to determining that the one or more pieces of data in the natural language data are based on the data generated using the at least one application, security gateway 120 identifies one or more sources corresponding to the one or more pieces of data (306).

In some implementations, the one or more sources are different from the at least one application. In such implementations, the at least one application generates the data using content obtained from the one or more sources. In some examples, the sources can include one or more of the following: websites, social media platforms, databases, online articles and journals, books and e-books, forums and discussion boards, APIs, audio databases, image and video libraries, scientific repositories, news outlets, government and public records, online marketplaces, medical records and health databases, cultural archives, satellite imagery and geospatial data, etc.

By performing process 300, security gateway 120 can provide enhanced data tracing ability to the system where security gateway 120 is deployed. With enhanced traceability, the system can ensure comprehensive data provenance, allowing for meticulous tracking of the data's origin within documents. The system can offer users the ability to precisely determine the source of document content, and the system can provide superior data tracking capabilities to enable detailed auditing of data sources in document creation. The system can also afford unparalleled visibility into the origins and history of document data, providing high-fidelity data source mapping and ensuring that users can effortlessly trace the genesis of information within documents. Moreover, the system's data tracing capabilities can permit a deep dive into the document's information sources for verification and validation purposes.

FIG. 4 illustrates a flowchart of an example process 400 for classification of user activities, in accordance with some implementations of the present disclosure. In some implementations, process 400 is performed by security gateway 120 described in this disclosure. Accordingly, the following description of process 400 is provided with respect to security gateway 120. The operations shown in process 400 may not be exhaustive and that other operations can be performed as well before, after, or in between any of the illustrated operations. Further, some of the operations may be performed simultaneously, or in a different order than shown in FIG. 4.

As shown, in the process 400, security gateway 120 accesses data exchanged during a communications session between a client device and a server (402). For example, security gateway 120 can act as a proxy in the network and accesses data exchanged in communications sessions between one or more client devices 102a-102b and one or more applications hosted by the servers 130a-130b.

In some implementations, the data exchanged during the communications session between the client device and the application hosted by the server includes natural language data, and accessing the data includes processing the natural language data. In some implementations, the natural language data include any information that is produced using the languages that humans use for daily communication. In some examples, the natural language data can include one or more of the following: text data, spoken language data, multimedia language data, user-generated content, language annotations, machine-generated natural language, linguistic metadata, non-verbal data, etc.

Security gateway 120 determines, based on the data exchanged during the communications session, an application hosted by the server and accessed by the client device in the communications session (404).

In some implementations, the application hosted by the server includes a GenAI application, such as a third-party AI application using one or more GenAI models. For example, the application can include an LLM-based GenAI application. In some implementations, the application hosted by the server includes email, voice, video, or other textual data applications that use one or more AI features.

In some implementations, security gateway 120 determines the application hosted by the server by analyzing one or more of the following: executable file names, application window titles, or application metadata. In such implementations, security gateway 120 is operable to monitor and evaluate the names of executable files as they are launched, scrutinize the titles of application windows as they become active on the user interface, and parse application metadata that uniquely identifies the software. Security gateway 120 can employ sophisticated algorithms to cross-reference these data points with a comprehensive database of application signatures, ensuring precise identification. By providing an accurate and reliable means to track application usage, security gateway 120 can disambiguously determine the exact application in use, thus enhancing the capabilities of usage monitoring and digital resource management systems.

Security gateway 120 determines a user account corresponding to the application that is used by the client device to access the application in the communications session (406).

In some implementations, security gateway 120 is operable to intercept and decipher the authentication tokens exchanged during a login process associated with the application, examine system log files for session initiation events, and extract account-related information from the application's API calls when available. Additionally, security gateway 120 can correlate this information with the active user profile within the operating system environment. By employing a combination of these strategies, security gateway 120 can accurately identify and record the user account in question, regardless of whether the application is locally installed or accessed via a web service. This allows for a meticulous and non-intrusive way to monitor user activity and application access, serving as a cornerstone for advanced user behavior analytics and security protocols.

Security gateway 120 determines one or more operations performed by the client device with the application in the communications session (408).

In some implementations, security gateway 120 determines the one or more operations by using one or more LLMs. In such implementations, the one or more LLMs used by security gateway 120 are different from one or more other LLMs used by the application hosted by the server.

In some implementations, the LLMs used by security gateway 120 are off-the-shelf LLMs that are pre-trained, generalized AI models available for immediate use.

In some implementations, the LLMs used by security gateway 120 are customized LLMs which have been tailored to fit the unique linguistic and task-specific requirements of particular applications or industries. In such implementations, these customizations can range from training the models on domain-specific corpora to fine-tuning them on a particular style or jargon. In some implementations, the LLMs used by security gateway 120 can be customized security LLMs that are trained on a corpus that includes security-related documentation, threat intelligence reports, vulnerability databases, and system log. In some examples, the LLMs used by security gateway 120 can be trained on datasets encompassing threat analysis reports, security bulletins, white papers, and datasets of known vulnerabilities. The LLMs used by security gateway 120 can be trained to possess the capability to interpret and synthesize security protocols, identify potential security breaches, suggest countermeasures, and understand the intricacies of network architectures and potential attack vectors. The LLMs used by security gateway 120 can be trained to aid in automating the detection of threats by parsing and analyzing vast amounts of data, including network logs and real-time system alerts. The LLMs used by security gateway 120 can be trained to generate human-like explanations of complex security concepts, craft security policy documents, and provide recommendations for system hardening and compliance.

In some implementations, security gateway 120 determines the one or more operations by analyzing one or more of the following: patterns in user interactions with the application, sequences of commands, or sequences of accessed application modules. In such implementations, security gateway 120 is operable to perform a comprehensive analysis of the user interaction patterns with the application's interface, such as mouse movements, clicks, and keystrokes. Furthermore, security gateway 120 can examine the sequences of commands inputted by the user and the progression through various modules of the application, which are indicative of user behavior and intent. In some examples, security gateway 120 is operable to leverage machine learning algorithms to discern and categorize operational patterns, allowing for the reconstruction of the user's workflow. These analyses enable security gateway 120 to not only capture discrete actions but also to understand the context and purpose behind a series of operations, which can provide an insightful and granular view of user engagement with the application.

Security gateway 120 determines one or more data repositories that are accessed by the client device during the one or more operations (410).

In some implementations, security gateway 120 determines the one or more data repositories by analyzing one or more of the following: file paths, database queries, or network access logs related to the one or more operations. In such implementations, security gateway 120 is operable to intercept network requests initiated by the client device and examining the destination endpoints to determine if they correspond to known data repository services. Security gateway 120 can inspect the system's DNS query logs and analyses the read/write operations performed by the device on the file system level to detect interactions with locally synced repository directories. By correlating these insights with a registry of data repository signatures, including but not limited to cloud storage URLs, database connection strings, and API access points, security gateway 120 can precisely attribute each access event to a specific data repository. These analyses provide a comprehensive overview of data retrieval and submission activities, which is crucial for ensuring data security and compliance with data governance policies.

In response to determining one or more of the user account, the one or more operations, or the one or more data repositories, security gateway 120 performs one or more security operations (412).

In some examples, the security operations can include, on GenAI traffic from end user to server application: role based access control; filter input query (e.g., user prompt) for intellectual property, and sensitive data leakage, toxic language, personally identifiable information, and malicious queries; prompt generation and acceleration to reduce hallucinations and improve explainability; mask (anonymize) sensitive data; guard against indirect prompt injections; audit; and visibility into user queries and/or application responses.

In some examples, the security operations can include, on GenAI traffic from the server application to the end user: unmask sensitive data; and moderate GenAI model response.

By performing process 400, security gateway 120 can provide classification of user activities with great granularities. Providing classification of user activities with greater granularity confers several advantages for systems that aim to analyze and leverage user behavior data effectively. For example, with detailed classification, services can be tailored to the individual preferences and behaviors of users, improving user satisfaction and engagement. Granular data allows for a more nuanced understanding of how users interact with a system, which can inform design improvements and optimize the user interface for better usability. Greater detail in classification reveals the subtleties of user behavior, leading to more accurate insights and a deeper understanding of user actions and motivations. Fine-grained behavioral data can improve the accuracy of predictive models, leading to better forecasting of future user actions.

By breaking down activities into granular components, it is easier to detect anomalous behavior that could indicate fraud, security breaches, or non-compliance with policies. Granular activity data enhances the capability of user behavior analytics (UBA) tools to learn normal user behavior patterns and detect potentially malicious deviations. By understanding the specific actions users perform, it is possible to implement more precise access controls that limit users to the minimum levels of access required for their activities (principle of least privilege). With better visibility into user activities, organizations can assess and manage risks more effectively, taking action to mitigate risks associated with user behavior.

It is to be noted that although process steps, method steps, algorithms or the like may be described in a sequential order above, such processes, methods and algorithms may generally be configured to work in alternate orders, unless specifically stated to the contrary.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

Figure 5:
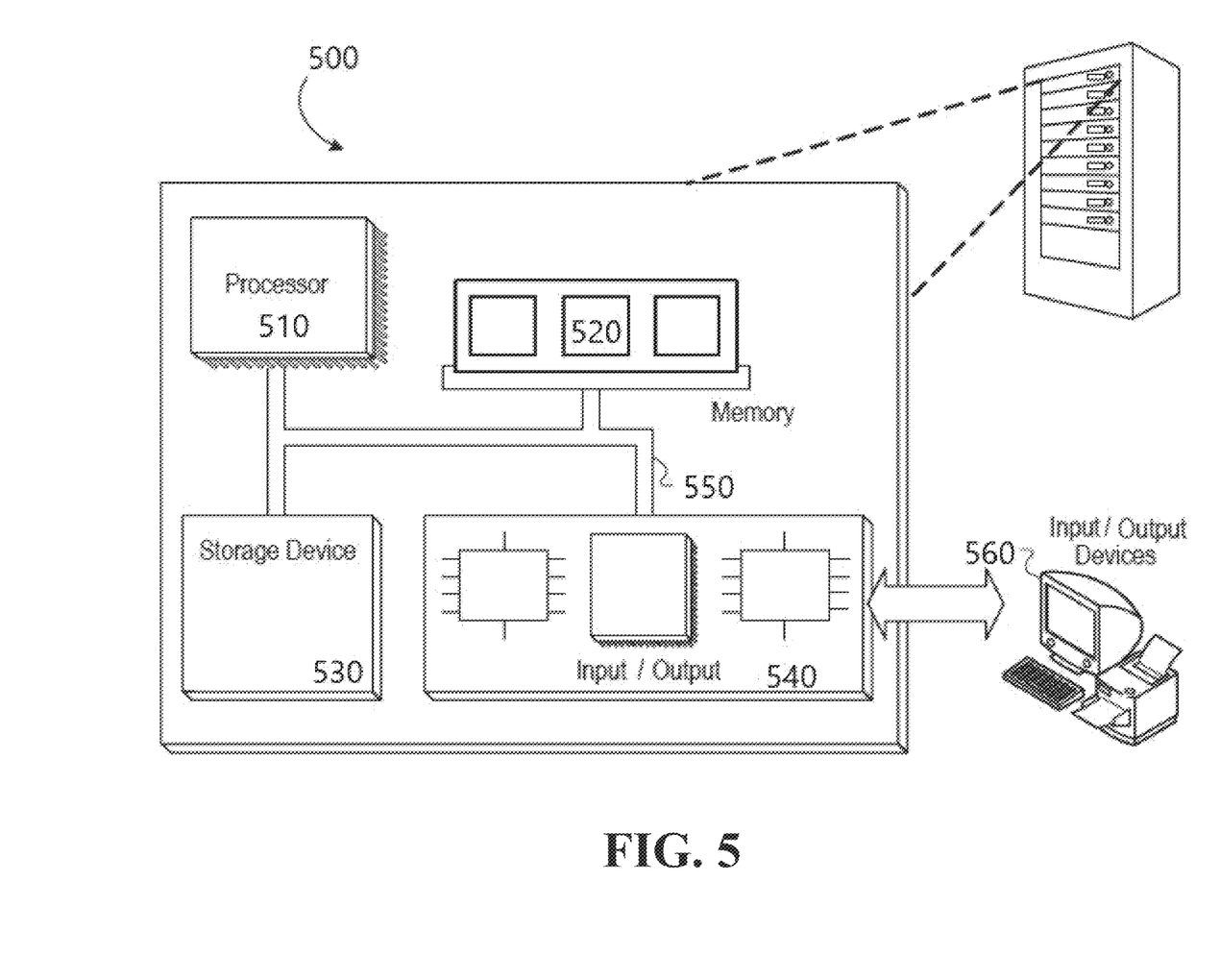
FIG. 5 illustrates a schematic diagram of an example computer system, according to some implementations.

FIG. 5 illustrates a schematic diagram of an example computer system 500. In some implementations, computer system 500 is an example of any suitable devices as described in this disclosure, such as one or more of client devices 102a-102b, security gateway 120, servers 130a-130b, or policy server 140. As shown, computer system 500 includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500. Note that computer system 500 is shown to include one processor 510, one memory 520, and one storage device 530 for illustrative purpose only. In some implementations, computer system 500 can include any suitable number, e.g., 2, 5 or 10, of processors 510, memories 520, and storage devices 530 based on system requirements.

The input/output device 540 provides input/output operations for the system 500. In some implementations, the input/output device 540 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 560. In some implementations, mobile computing devices, mobile communication devices, and other devices can be used.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus, comprising:
one or more processors that are configured to:
    access data in a communications session between a client device and an application hosted by a server, wherein the client device and the server are communicably coupled to the apparatus through one or more network connections;
    inspect one or more access control lists that indicate which users or system processes are granted access to the data using one or more large language models (LLMs), wherein the one or more LLMs are trained to generate one or more security policies by inspecting natural language data of one or more human-readable security policies provided by a policy server, the one or more human-readable security policies comprising at least one of a traffic filtering policy, an intrusion prevention policy, or an authentication and authorization policy;
    in response to inspecting the one or more access control lists, perform one or more security operations on the data in accordance with the security policies generated by the one or more LLMs, wherein the one or more security operations comprise role-based access control for the data in the communication session;
    provide feedback to the policy server, the feedback comprising one or more of logs, alerts, or metrics associated with the one or more security operations; and
    receive updated security policies from the policy server.

2. The apparatus of claim 1, wherein accessing the data comprises processing natural language data.

3. The apparatus of claim 2, wherein the application is a Generative AI (GenAI) application, and the communications session corresponds to GenAI communications between a user of the client device and the application.

4. The apparatus of claim 3, wherein the GenAI application is associated with one or more third party LLMs that are distinct from the one or more LLMs used by the one or more processors.

5. The apparatus of claim 1, wherein the one or more processors include one or more of Field Programmable Gate Array (FPGA) or Application Specific Integrated Circuit (ASIC) processors.

6. One or more non-transitory computer readable storage media storing instructions that, when executed by one or more processors, cause the one or more processors to perform operations comprising:

accessing data in a communications session between a client device and an application hosted by a server, wherein the client device and the server are communicably coupled to an apparatus through one or more network connections;

inspecting one or more access control lists that indicate which users or system processes are granted access to the data using one or more large language models (LLMs), wherein the one or more LLMs are trained to generate one or more security policies by inspecting natural language data of one or more human-readable security policies provided by a policy server, the one or more human-readable security policies comprising at least one of a traffic filtering policy, an intrusion prevention policy, or an authentication and authorization policy;

in response to inspecting the one or more access control lists, performing one or more security operations on the data in accordance with the security policy documents associated with policies generated by the one or more LLMs, wherein the one or more security operations comprise role-based access control for the data in the communication session;

providing feedback to the policy server, the feedback comprising one or more of logs, alerts, or metrics associated with the one or more security operations; and receiving updated security policies from the policy server.

7. The one or more non-transitory computer readable storage media of claim 6, wherein accessing the data comprises processing natural language data.

8. The one or more non-transitory computer readable storage media of claim 7, wherein the application is a Generative AI (GenAI) application, and the communications session corresponds to GenAI communications between a user of the client device and the application.

9. The one or more non-transitory computer readable storage media of claim 8, wherein the GenAI application is associated with one or more third party LLMs that are distinct from the one or more LLMs used by the one or more processors.

10. The one or more non-transitory computer readable storage media of claim 6, wherein the one or more processors include one or more of Field Programmable Gate Array (FPGA) or Application Specific Integrated Circuit (ASIC) processors.

11. A method, comprising:

accessing, by one or more processors, data in a communications session between a client device and an application hosted by a server, wherein the client device and the server are communicably coupled to an apparatus through one or more network connections;

inspecting, by the one or more processors, one or more access control lists that indicate which users or system processes are granted access to the data using one or more large language models (LLMs), wherein the one or more LLMs are trained to generate one or more security policies by inspecting natural language data of one or more human-readable security policies provided by a policy server, the one or more human-readable security policies comprising at least one of a traffic filtering policy, an intrusion prevention policy, or an authentication and authorization policy;

in response to inspecting the one or more access control lists, performing, by the one or more processors, one or more security operations on the data in accordance with the security policies generated by the one or more LLMs, wherein the one or more security operations comprise role-based access control for the data in the communication session;

providing feedback to the policy server, the feedback comprising one or more of logs, alerts, or metrics associated with the one or more security operations; and receiving updated security policies from the policy server.

12. The method of claim 11, wherein accessing the data comprises processing natural language data.

13. The method of claim 12, wherein the application is a Generative AI (GenAI) application, and the communications session corresponds to GenAI communications between a user of the client device and the application.

14. The method of claim 13, wherein the GenAI application is associated with one or more third party LLMs that are distinct from the one or more LLMs used by the one or more processors.

15. The method of claim 11, wherein the one or more processors include one or more of Field Programmable Gate Array (FPGA) or Application Specific Integrated Circuit (ASIC) processors.

16. The apparatus of claim 1, wherein the security operations further comprise at least one of the following:

filtering input query;
prompt generation and acceleration;
masking or unmasking sensitive data;
providing guard against indirect prompt injections;
auditing; or
moderating GenAI model responses.

17. The apparatus of claim 1, wherein the one or more human-readable security policies further comprise one or more of the following:

VPN enforcement policy,
antivirus/antimalware policy,
data loss prevention (DLP) policy,
bandwidth management policy,
secure socket layer (SSL) inspection policy,
logging and monitoring policy,
incident response policy, or
configuration and patch management policy.

18. The apparatus of claim 1, wherein the one or more LLMs are trained to interpret and synthesize security protocols.

19. The apparatus of claim 1, wherein the one or more LLMs are trained based on one or more of the following: threat analysis reports, security bulletins, white papers, or datasets of known vulnerabilities.

20. The apparatus of claim 1, wherein the one or more LLMs are trained to perform one or more of the following: interpreting and synthesizing security protocols, identifying potential security breaches, suggesting countermeasures, generating human-like explanation of security concepts, or providing recommendations for system hardening and compliance.

* * * * *